(12) United States Patent
Wiedenhoefer et al.

(10) Patent No.: US 11,920,517 B2
(45) Date of Patent: *Mar. 5, 2024

(54) AIRCRAFT BYPASS DUCT HEAT EXCHANGER

(71) Applicant: Raytheon Technologies Corporation, Farmington, CT (US)

(72) Inventors: James F. Wiedenhoefer, Windsor, CT (US); Russell J. Bergman, South Windsor, CT (US); William P. Stillman, Westminster, CO (US); Patrick M. Hart, Newington, CT (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,355

(22) Filed: Jul. 25, 2022

(65) Prior Publication Data

US 2022/0372914 A1  Nov. 24, 2022

Related U.S. Application Data

(63) Continuation of application No. 17/139,174, filed on Dec. 31, 2020, now Pat. No. 11,448,132.

(Continued)

(51) Int. Cl.
*F02C 9/18* (2006.01)
*F02C 7/18* (2006.01)
*F02K 3/115* (2006.01)

(52) U.S. Cl.
CPC ............... *F02C 7/185* (2013.01); *F02C 7/18* (2013.01); *F02K 3/115* (2013.01); *F05D 2260/213* (2013.01)

(58) Field of Classification Search
CPC ...... F02C 7/18; F02C 7/185; F05D 2260/213; F02K 3/115
See application file for complete search history.

(56) References Cited

U.S. PATENT DOCUMENTS

| 1,311,549 A | 7/1919 | Bowman |
| 3,552,488 A | 1/1971 | Grill et al. |

(Continued)

FOREIGN PATENT DOCUMENTS

| CN | 101309577 A | 11/2008 |
| CN | 106168452 B | 8/2018 |

(Continued)

OTHER PUBLICATIONS

Chris Wiegand et al., "F-35 Air Vehicle Technology Overview", Aviation Technology, Integration, and Operations Conference, Jun. 2018, American Institute of Aeronautics and Astronautics, Inc., Reston, Virginia.

(Continued)

*Primary Examiner* — Katheryn A Malatek
(74) *Attorney, Agent, or Firm* — Bachman & LaPointe, P.C.

(57) ABSTRACT

A turbine engine heat exchanger has an array of heat exchanger plates mounted to an inner case wall for providing heat transfer from a bleed flowpath to a bypass flowpath. Each plate has: first and second faces along the bypass flowpath; a proximal edge mounted to the inner case wall; an inlet along the proximal edge; an outlet along the proximal edge; and a branch segment of the bleed flowpath passing from the inlet to the outlet.

21 Claims, 11 Drawing Sheets

Related U.S. Application Data

(60) Provisional application No. 62/971,442, filed on Feb. 7, 2020, provisional application No. 62/963,072, filed on Jan. 19, 2020, provisional application No. 62/957,091, filed on Jan. 3, 2020.

(56) References Cited

U.S. PATENT DOCUMENTS

| | | |
|---|---|---|
| 4,137,705 A | 2/1979 | Anderson et al. |
| 4,438,809 A | 3/1984 | Papis |
| 4,520,868 A | 6/1985 | Grawey |
| 4,715,431 A | 12/1987 | Schwarz et al. |
| 4,738,311 A | 4/1988 | Bleckman |
| 4,813,112 A | 3/1989 | Pilliez |
| 5,009,263 A | 4/1991 | Seshimo et al. |
| 5,107,922 A | 4/1992 | So |
| 5,318,114 A | 6/1994 | Sasaki |
| 5,417,280 A | 5/1995 | Hayashi et al. |
| 5,443,116 A | 8/1995 | Hayashi et al. |
| 5,517,757 A | 5/1996 | Hayashi et al. |
| 5,531,268 A | 7/1996 | Hoshino et al. |
| 5,718,127 A | 2/1998 | Aitken |
| 6,134,880 A * | 10/2000 | Yoshinaka ............ F28D 9/0018 60/806 |
| 6,328,100 B1 | 12/2001 | Haussmann |
| 6,357,113 B1 | 3/2002 | Williams |
| 6,430,931 B1 | 8/2002 | Horner |
| 6,564,863 B1 | 5/2003 | Martins |
| 6,607,026 B1 | 8/2003 | Naji et al. |
| 6,945,320 B2 | 9/2005 | Harvard, Jr. et al. |
| 6,966,173 B2 | 11/2005 | Dewis |
| 7,334,411 B2 | 2/2008 | Vandermolen |
| 7,669,645 B2 | 3/2010 | Nakamura |
| 7,770,633 B2 | 8/2010 | Miyahara |
| 7,784,528 B2 | 8/2010 | Ottow et al. |
| 7,861,512 B2 | 1/2011 | Olver et al. |
| 7,950,149 B2 | 5/2011 | Golecki |
| 8,181,443 B2 | 5/2012 | Rago |
| 8,266,888 B2 | 9/2012 | Liu |
| 8,387,362 B2 | 3/2013 | Storage et al. |
| 8,438,835 B2 | 5/2013 | Perveiler et al. |
| 8,510,945 B2 | 8/2013 | Hand et al. |
| 8,573,291 B2 | 11/2013 | Vick |
| 8,656,988 B1 | 2/2014 | Paul et al. |
| 8,689,547 B2 | 4/2014 | Burgers et al. |
| 8,770,269 B2 | 7/2014 | Scott |
| 8,784,047 B2 | 7/2014 | Elder |
| 9,200,855 B2 | 12/2015 | Kington et al. |
| 9,243,563 B2 | 1/2016 | Lo |
| 9,328,968 B2 | 5/2016 | Vanderwees |
| 9,341,119 B2 | 5/2016 | Rhoden |
| 9,377,250 B2 | 6/2016 | Landre |
| 9,732,702 B2 | 8/2017 | Ueda |
| 9,752,803 B2 | 9/2017 | Matter, III et al. |
| 9,766,019 B2 | 9/2017 | Eleftheriou et al. |
| 9,771,867 B2 | 9/2017 | Karam et al. |
| 9,816,766 B2 | 11/2017 | Miller et al. |
| 9,835,043 B2 | 12/2017 | Kantany et al. |
| 9,851,159 B2 | 12/2017 | Cameron |
| 9,909,812 B2 | 3/2018 | Peskos et al. |
| 9,982,630 B2 | 5/2018 | Marini et al. |
| 10,041,741 B2 | 8/2018 | Turcotte et al. |
| 10,082,081 B2 | 9/2018 | Murphy et al. |
| 10,100,740 B2 | 10/2018 | Thomas |
| 10,125,684 B2 | 11/2018 | Yu |
| 10,175,003 B2 | 1/2019 | Sennoun et al. |
| 10,184,400 B2 | 1/2019 | Cerny et al. |
| 10,208,621 B2 | 2/2019 | Hoefler et al. |
| 10,222,142 B2 | 3/2019 | Alvarez et al. |
| 10,316,750 B2 | 6/2019 | Loebig et al. |
| 10,422,585 B2 | 9/2019 | Jensen et al. |
| 10,480,407 B2 | 11/2019 | Alecu |
| 10,830,540 B2 | 11/2020 | Sennoun et al. |
| 10,926,364 B2 | 2/2021 | Thresher |
| 11,219,841 B2 | 1/2022 | Wan et al. |
| 11,585,273 B2 | 2/2023 | Wiedenhoefer et al. |
| 2001/0018024 A1 | 8/2001 | Hyde et al. |
| 2004/0026072 A1 | 2/2004 | Yi et al. |
| 2004/0040153 A1 | 3/2004 | Ashida et al. |
| 2004/0050531 A1 | 3/2004 | Horiuchi et al. |
| 2004/0111829 A1 | 6/2004 | Bruno et al. |
| 2006/0131009 A1 | 6/2006 | Nies |
| 2008/0283234 A1 | 11/2008 | Sagi et al. |
| 2009/0169359 A1 | 7/2009 | Murphy et al. |
| 2010/0084120 A1 | 4/2010 | Yin et al. |
| 2010/0170262 A1 | 7/2010 | Kaslusky et al. |
| 2011/0088405 A1 * | 4/2011 | Turco ............... F02C 7/185 60/785 |
| 2011/0146944 A1 | 6/2011 | Hand et al. |
| 2011/0168366 A1 | 7/2011 | Garret et al. |
| 2013/0199152 A1 | 8/2013 | Menheere et al. |
| 2013/0213623 A1 | 8/2013 | Perocchio et al. |
| 2014/0246179 A1 | 9/2014 | Vallee et al. |
| 2014/0318751 A1 | 10/2014 | Kinder et al. |
| 2015/0047818 A1 | 2/2015 | Peskos et al. |
| 2015/0047820 A1 | 2/2015 | Rhoden |
| 2016/0069266 A1 | 3/2016 | Murphy et al. |
| 2016/0123230 A1 | 5/2016 | Thomas |
| 2016/0177828 A1 | 6/2016 | Snyder et al. |
| 2016/0230669 A1 | 8/2016 | Selstad et al. |
| 2016/0265850 A1 | 9/2016 | Kupiszewski et al. |
| 2016/0362999 A1 | 12/2016 | Ho |
| 2017/0009703 A1 | 1/2017 | Moon et al. |
| 2017/0184024 A1 | 6/2017 | Sennoun |
| 2017/0363361 A1 | 12/2017 | Turney |
| 2018/0051935 A1 | 2/2018 | Roberge |
| 2018/0058472 A1 | 3/2018 | Tajiri et al. |
| 2018/0172368 A1 | 6/2018 | Kowalski et al. |
| 2018/0238238 A1 | 8/2018 | Luschek et al. |
| 2018/0238630 A1 | 8/2018 | Pollard et al. |
| 2018/0244127 A1 | 8/2018 | Sennoun et al. |
| 2018/0245853 A1 | 8/2018 | Sennoun et al. |
| 2018/0258859 A1 | 9/2018 | Suciu et al. |
| 2018/0292140 A1 | 10/2018 | Mayo et al. |
| 2018/0328285 A1 | 11/2018 | Tajiri et al. |
| 2019/0154345 A1 | 5/2019 | Martinez et al. |
| 2019/0170445 A1 | 6/2019 | McCaffrey |
| 2019/0170455 A1 | 6/2019 | McCaffrey |
| 2019/0204012 A1 | 7/2019 | Army et al. |
| 2019/0212074 A1 | 7/2019 | Lockwood et al. |
| 2019/0234690 A1 | 8/2019 | Sobolak et al. |
| 2019/0277571 A1 | 9/2019 | Disori et al. |
| 2019/0277579 A1 | 9/2019 | Disori et al. |
| 2019/0293365 A1 | 9/2019 | Disori et al. |
| 2019/0293366 A1 | 9/2019 | Disori et al. |
| 2019/0310030 A1 | 10/2019 | Disori et al. |
| 2019/0339012 A1 | 11/2019 | Disori et al. |
| 2020/0072559 A1 | 3/2020 | Sennoun et al. |
| 2020/0189046 A1 | 6/2020 | Ravindranath et al. |
| 2020/0347737 A1 | 11/2020 | Bordoni |
| 2020/0395890 A1 | 12/2020 | Hutting et al. |
| 2021/0207535 A1 | 7/2021 | Bergman et al. |
| 2021/0222624 A1 | 7/2021 | Wiedenhoefer et al. |
| 2021/0222962 A1 | 7/2021 | Wiedenhoefer et al. |
| 2021/0222963 A1 | 7/2021 | Bergman et al. |
| 2021/0285375 A1 | 9/2021 | Wiedenhoefer et al. |
| 2021/0318071 A1 | 10/2021 | Hart et al. |
| 2022/0373263 A1 | 11/2022 | Wiedenhoefer et al. |

FOREIGN PATENT DOCUMENTS

| | | |
|---|---|---|
| CN | 108869044 A | 11/2018 |
| CN | 208368689 U | 1/2019 |
| CN | 110553533 A | 12/2019 |
| DE | 9309822 U1 | 11/1994 |
| DE | 19515528 A1 | 10/1996 |
| DE | 102004058499 A1 | 6/2006 |
| DE | 102008051422 A1 | 4/2010 |
| EP | 0091873 A1 | 10/1983 |
| EP | 0223995 B1 | 1/1990 |
| EP | 656517 A1 | 11/1994 |
| FR | 2770632 A1 | 5/1999 |
| FR | 3075870 A1 | 6/2019 |
| GB | 574450 A | 1/1946 |

(56) References Cited

FOREIGN PATENT DOCUMENTS

| JP | H0961084 A | 3/1997 |
|----|------------|--------|
| JP | 11-148793 A | 6/1999 |
| WO | 2007/048889 A1 | 5/2007 |
| WO | 2014/172788 A1 | 10/2014 |
| WO | 2016/096042 A1 | 6/2016 |
| WO | 2021/138307 A1 | 7/2021 |
| WO | 2021/146674 A1 | 7/2021 |

OTHER PUBLICATIONS

Jonathan Lowell, "Keeping Cool over Salt Lake", Aug. 25, 2019, US Air Force, Washington, DC, retrieved from internet Nov. 9, 2019 https://www.af.mil/News/Commentaries/Display/Article/1941943/keeping-cool-over-salt-lake/.
Sean Robert Nuzum, Thesis: "Aircraft Thermal Management using Liquefied Natural Gas", Apr. 27, 2016, Wright State University, Dayton, Ohio.
U.Ss Office Action dated Jul. 6, 2023 for U.S. Appl. No. 17/125,214.
U.S. Office Action dated Nov. 9, 2021 for U.S. Appl. No. 17/139,174.
European Search Report and Opinion dated Oct. 20, 2021 for European Patent Application No. 20218011.3.
U.S. Office Action dated Apr. 26, 2022 for U.S. Appl. No. 17/137,946.
Extended European Search Report dated Mar. 31, 2022 for European Patent Application No. 20910078.3 (EP stage of PCT/US20/67289-WO/2021/138307).
Extended European Search Report dated Mar. 31, 2022 for European Patent Application No. 21191780.2 (EP divisional of PCT/US20/67289-WO/2021/138307).
International Search Report and Written Opinion dated Mar. 31, 2021 for PCT/US21/13804.
European Search Report dated Feb. 7, 2022 for European Patent Application No. 21740964.8 (EP stage of PCT/US2021/013804-WO/2021/146674).
U.S. Office Action dated Dec. 13, 2021 for U.S. Appl. No. 17/124,551.
International Search Report and Written Opinion dated Mar. 19, 2021 for PCT/US20/67289.
European Search Report dated Nov. 25, 2021 for European Patent Application No. 20910078.3 (EP stage of PCT/US2020/067289-WO/2021/138307).
European Search Report dated Nov. 19, 2021 for European Patent Application No. 21191780.2 (divisional of EP stage of PCT/US2020/067289-WO/2021/138307).
U.S. Office Action dated Aug. 1, 2023 for U.S. Appl. No. 18/100,130.
U.S. Office Action dated May 8, 2023 for U.S. Appl. No. 17/981,266.
U.S. Office Action dated Jul. 6, 2023 for U.S. Appl. No. 17/125,214.
U.S. Office Action dated Jun. 12, 2023 for U.S. Appl. No. 18/094,606.
U.S. Office Action dated Jun. 21, 2022 for U.S. Appl. No. 17/139,180.
European Office Action dated Sep. 27, 2023 for European Patent Application No. 21191780.2 (divisional of EP stage of PCT/US2020/067289-WO/2021/138307).
European Search Report dated Aug. 4, 2023 for European Patent Application No. 23184866.4.

\* cited by examiner

AIRCRAFT BYPASS DUCT HEAT EXCHANGER

CROSS-REFERENCE TO RELATED APPLICATIONS

This is a continuation of U.S. patent application Ser. No. 17/139,174, filed Dec. 31, 2020 which claims benefit of U.S. Patent Application No. 62/971,442, filed Feb. 7, 2020, and entitled "Aircraft Bypass Duct Heat Exchanger", U.S. Patent Application No. 62/963,072, filed Jan. 19, 2020, and entitled "Aircraft Heat Exchanger", and U.S. Patent Application No. 62/957,091, filed Jan. 3, 2020, and entitled "Aircraft Heat Exchanger Assembly", the disclosures of which four applications are incorporated by reference herein in their entireties as if set forth at length.

BACKGROUND

The disclosure relates to gas turbine engine heat exchangers. More particularly, the disclosure relates to air-to-air heat exchangers.

Gas turbine engines (used in propulsion and power applications and broadly inclusive of turbojets, turboprops, turbofans, turboshafts, industrial gas turbines, and the like) include a variety of heat exchangers. Examples of gas turbine engine heat exchangers are found in: United States Patent Application Publication 20190170445A1 (the '445 publication), McCaffrey, Jun. 6, 2019, "HIGH TEMPERATURE PLATE FIN HEAT EXCHANGER"; United States Patent Application Publication 20190170455A1 (the '455 publication), McCaffrey, Jun. 6, 2019, "HEAT EXCHANGER BELL MOUTH INLET"; and United States Patent Application Publication 20190212074A1 (the '074 publication), Lockwood et al., Jul. 11, 2019, "METHOD FOR MANUFACTURING A CURVED HEAT EXCHANGER USING WEDGE SHAPED SEGMENTS", the disclosures of which three publications are incorporated by reference in their entireties herein as if set forth at length.

An exemplary positioning of such a heat exchanger provides for the transfer of thermal energy from a flow (heat donor flow) diverted from an engine core flow to a bypass flow (heat recipient flow). For example, air is often diverted from the compressor for purposes such as cooling the turbine or aircraft systems. However, the act of compression heats the air and reduces its cooling effectiveness. Accordingly, the diverted air may be cooled in the heat exchanger to render it more suitable for cooling or other purposes. One particular example draws the heat donor airflow from a diffuser case downstream of the last compressor stage upstream of the combustor. This donor flow transfers heat to a recipient flow which is a portion of the bypass flow. To this end, the heat exchanger may be positioned within a fan duct or other bypass duct. The cooled donor flow is then returned to the engine core (e.g., radially inward through struts) to pass radially inward of the gas path and then be passed rearward for turbine section cooling including the cooling of turbine blades and vanes. The heat exchanger may conform to the bypass duct. The bypass duct is generally annular. Thus, the heat exchanger may occupy a sector of the annulus up to the full annulus.

Other heat exchangers may carry different fluids and be in different locations. For example, instead of rejecting heat to an air flow in a bypass duct, other heat exchangers may absorb heat from a core flow (e.g., as in recuperator use).

U.S. Pat. No. 10,100,740 (the '740 patent, the disclosure of which is incorporated by reference in its entirety herein as if set forth at length), to Thomas, Oct. 16, 2018, "Curved plate/fin heater exchanger", shows attachment of a square wave form fin array to the side of a heat exchanger plate body. For radially-extending plates in a radial array, the wave amplitude progressively increases to accommodate a similar increase in inter-plate spacing.

SUMMARY

One aspect of the disclosure involves a turbine engine comprising: one or more fan sections; one or more compressor sections aft and downstream of the one or more fan sections along a core flowpath; a combustor section downstream of the one or more compressor sections along the core flowpath; one or more turbine sections downstream of the combustor section along the core flowpath; a bypass flowpath; an inner case wall along the bypass flowpath; and an array of heat exchanger plates mounted to the inner case wall for providing heat transfer from a first flowpath to the bypass flowpath. Each plate has: first and second faces along the bypass flowpath; a proximal edge mounted to the inner case wall; an inlet along the proximal edge; an outlet along the proximal edge; and a branch segment of the first flowpath passing from the inlet to the outlet.

A further embodiment of any of the foregoing embodiments may additionally and/or alternatively include the array of heat exchanger plates being mounted to a segment of the inner case wall.

A further embodiment of any of the foregoing embodiments may additionally and/or alternatively include the segment of the inner case wall being a single metallic plate.

A further embodiment of any of the foregoing embodiments may additionally and/or alternatively include: the inner case wall having a plurality of first ports and a plurality of second ports; the first ports being mated to the plate inlets; and the second ports being mated to the plate outlets.

A further embodiment of any of the foregoing embodiments may additionally and/or alternatively include: the inner case wall first ports being aft of the second ports; and the first ports being mated to the plate inlet ports.

A further embodiment of any of the foregoing embodiments may additionally and/or alternatively include: the inner case wall first ports being open to a diffuser outboard of the combustor; and the inner case wall second ports being open to an outlet plenum.

A further embodiment of any of the foregoing embodiments may additionally and/or alternatively include a manifold shroud mounted to an inner diameter surface of the inner case wall to bound the outlet plenum.

A further embodiment of any of the foregoing embodiments may additionally and/or alternatively include a flange extending radially inward from the inner diameter surface of the inner case wall to separate a downstream segment of the first flowpath exiting the heat exchanger from an upstream segment of the first flowpath entering the heat exchanger.

A further embodiment of any of the foregoing embodiments may additionally and/or alternatively include the outlet plenum having a plurality of legs.

A further embodiment of any of the foregoing embodiments may additionally and/or alternatively include each plate having: multiple said inlets along the proximal edge; multiple said outlets along the proximal edge; and respective said branch segments from each said inlet to an associated said outlet.

A further embodiment of any of the foregoing embodiments may additionally and/or alternatively include the first flowpath being a compressor bleed flowpath.

A further embodiment of any of the foregoing embodiments may additionally and/or alternatively include the first flowpath provides turbine cooling.

A further embodiment of any of the foregoing embodiments may additionally and/or alternatively include the bypass flowpath extending from a stage of the one or more fan sections.

A further embodiment of any of the foregoing embodiments may additionally and/or alternatively include the first flowpath extending from within or downstream of the one or more compressor sections.

A further embodiment of any of the foregoing embodiments may additionally and/or alternatively include a method for using the turbine engine The method comprises running the turbine engine to transfer thermal energy from a flow along the first flowpath to a bypass flow along the bypass flowpath.

A further embodiment of any of the foregoing embodiments may additionally and/or alternatively include the running: passing the bypass flow to the heat exchanger at a first temperature and first pressure; and passing the flow along the first flowpath to the heat exchanger at a second temperature and second pressure greater than the first temperature and first pressure, respectively.

A further embodiment of any of the foregoing embodiments may additionally and/or alternatively include the flow being generally counter-flow to the bypass flow.

A further embodiment of any of the foregoing embodiments may additionally and/or alternatively include the flow being generally cross-flow to the bypass flow.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
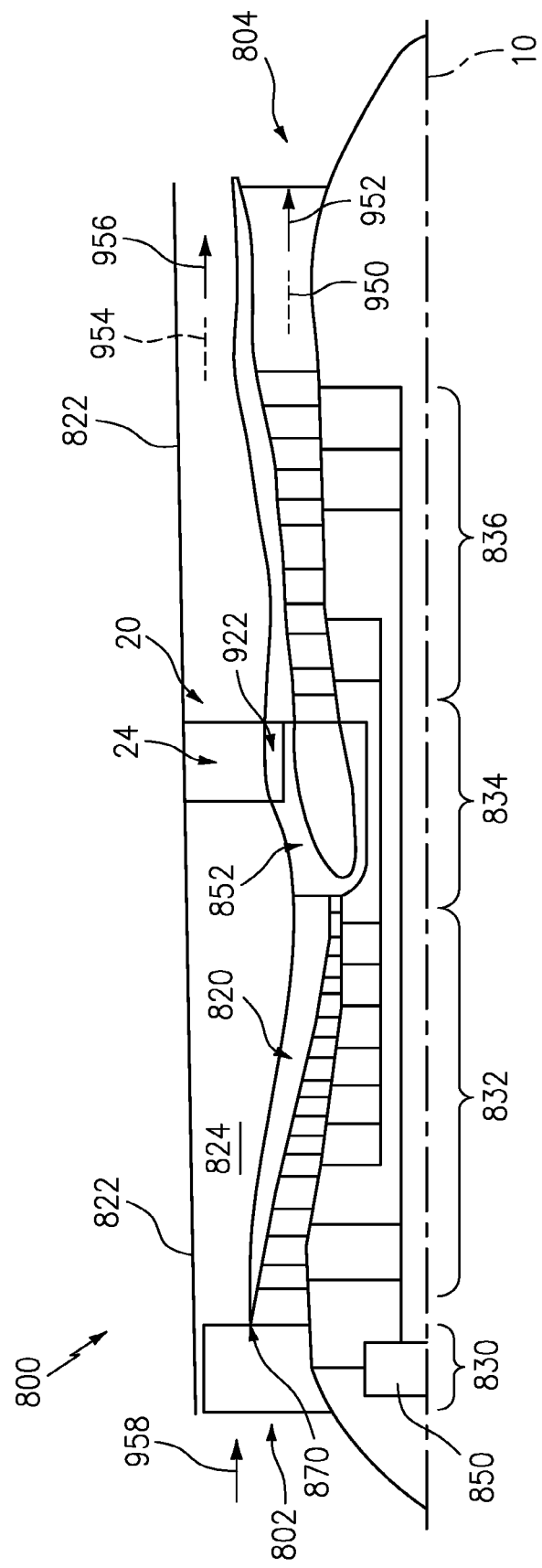
FIG. 1 is a partially schematic half sectional view of a gas turbine engine.

FIG. 1 schematically shows a gas turbine engine 800 as a turbofan engine having a centerline or central longitudinal axis 10 and extending from an upstream end at an inlet 802 to a downstream end at an outlet 804. The exemplary engine schematically includes a core flowpath 950 passing a core flow 952 and a bypass flowpath 954 passing a bypass flow 956. The core flow and bypass flow are initially formed by respective portions of a combined inlet airflow 958 divided at a splitter 870.

A core case (inner diameter (ID) case) or other structure 820 divides the core flowpath from the bypass flowpath. The bypass flowpath is, in turn, surrounded by an outer case (outer diameter (OD) case) 822 which, depending upon implementation, may be a fan case. A bypass duct 824 is radially between the ID case and OD case. From upstream to downstream, the engine includes a fan section 830 having one or more fan blade stages, a compressor 832 having one or more sections each having one or more blade stages, a combustor 834 (e.g., annular, can type, or reverse flow), and a turbine 836 again having one or more sections each having one or more blade stages. For example, many so called two-spool engines have two compressor sections and two turbine sections with each turbine section driving a respective associated compressor section and a lower pressure downstream turbine section also driving the fan (optionally via a gear reduction 850). Yet other arrangements are possible.

Figure 1A:
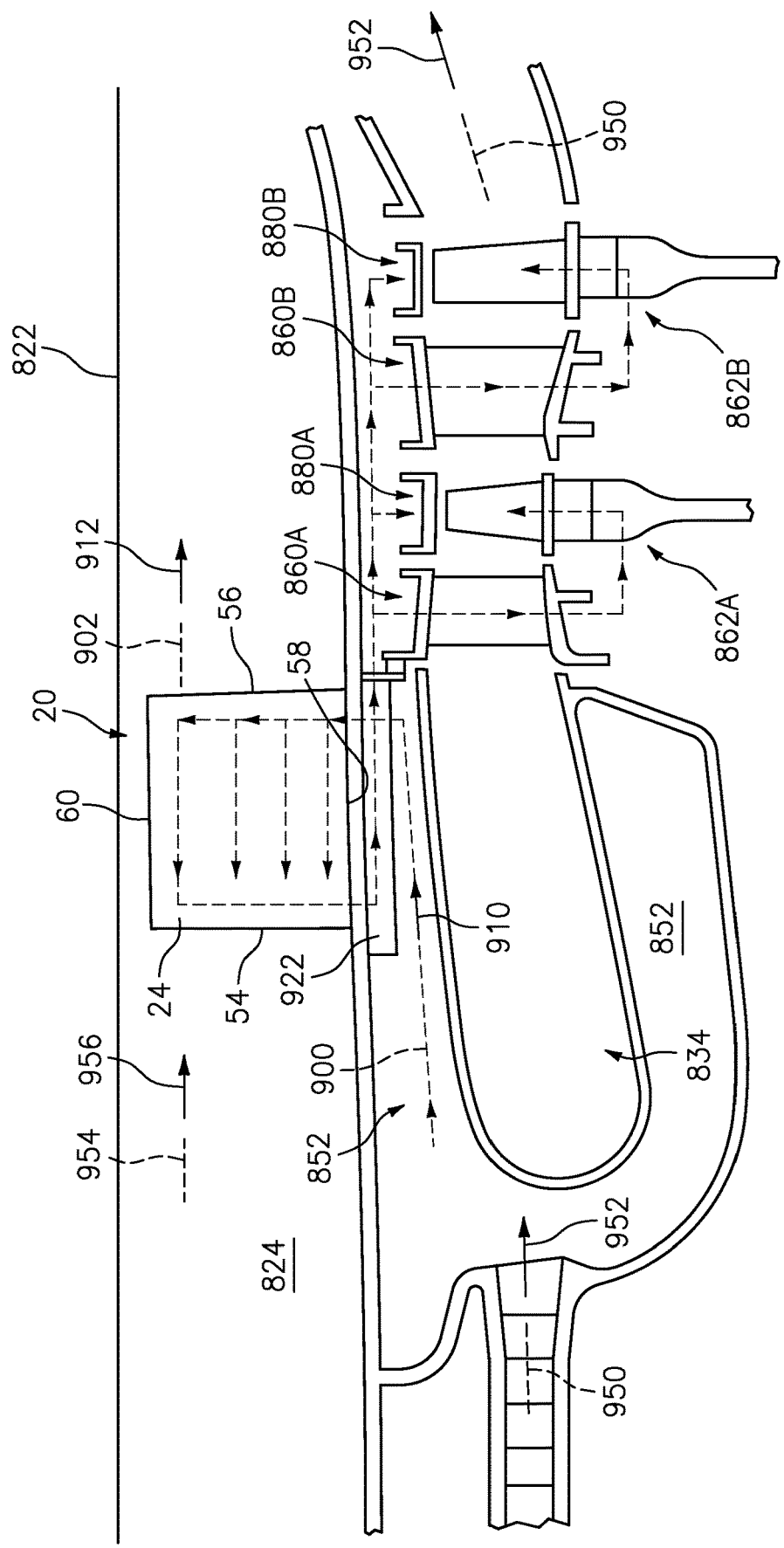
FIG. 1A is an enlarged view of a heat exchanger in a duct of the engine of FIG. 1.
Figure 2:
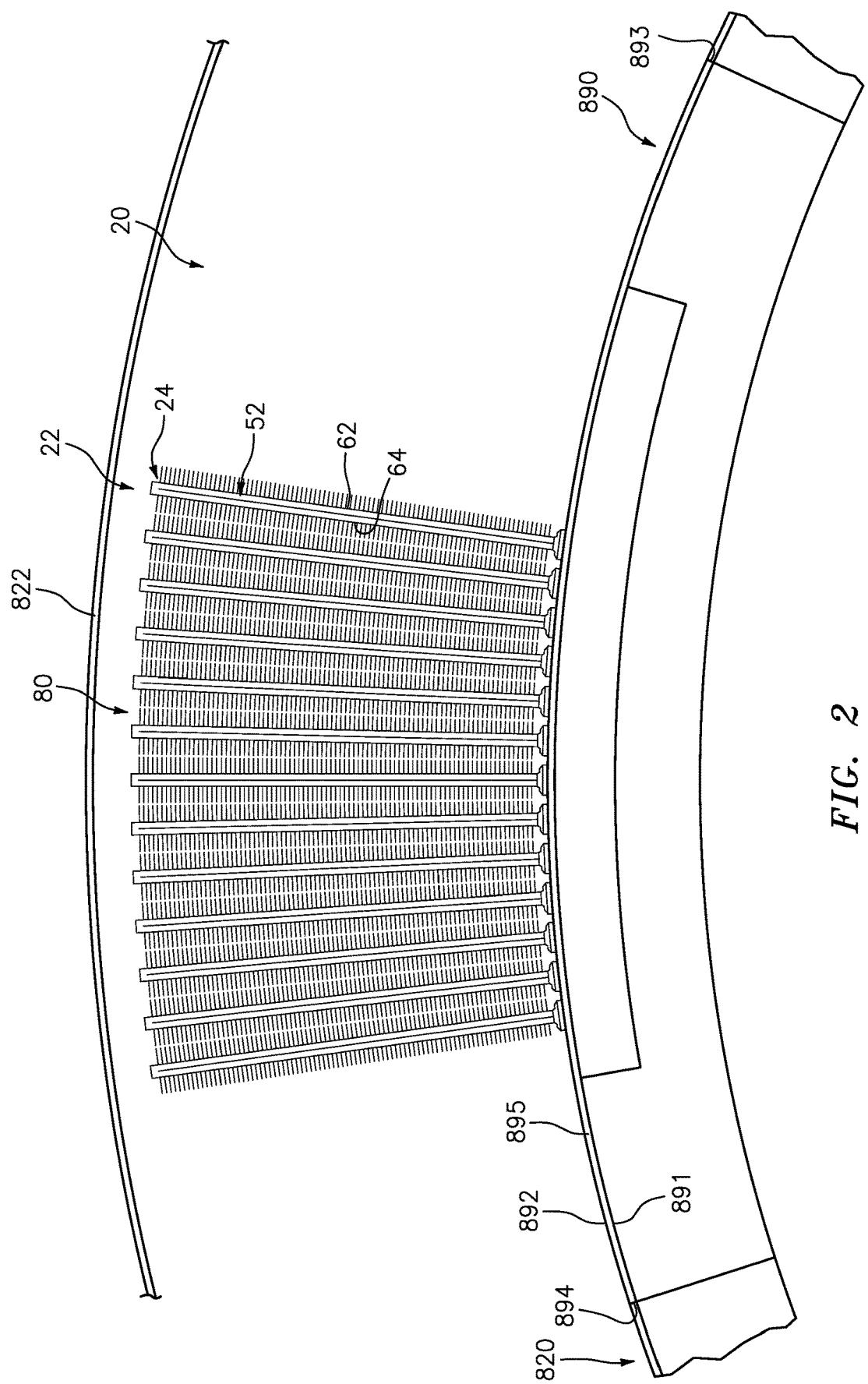
FIG. 2 is a front view of a heat exchanger in the engine of FIG. 1.

FIG. 1 shows a heat exchanger 20 having an array 22 (FIG. 2) of plates 24 positioned in the bypass flowpath. FIG. 2 shows the heat exchanger 20 as occupying a partial sector of the annular bypass flowpath. Nevertheless, multiple such heat exchangers may be positioned circumferentially end-to-end to occupy a larger sector. The heat exchanger 20 provides for heat transfer from a first flowpath 900 (FIG. 1A) and its flow 910 to a second flowpath 902 and its flow 912. FIG. 1A shows the heat exchanger 20 positioned in duct 824 and the bypass flowpath 954 so that a portion of the bypass flowpath 954 becomes the second flowpath 902 and a portion of the bypass flow 956 becomes the second airflow 912.

The exemplary first airflow 910 is drawn as a compressed bleed flow from a combustor diffuser 852 enclosing/surrounding the combustor 834. Thus, the flowpath 900 is a bleed flowpath branching from the core flowpath 950.

The flow 910 may be used for any of several purposes including, for example, thermal control over a blade outer air seal (BOAS) 880A, 880B (FIG. 1A) and/or turbine cooling. Thus, in the example, the cooled flow 912 may be passed (alternatively, via piping—not shown) directly to the BOAS 880A, 880B or radially inward across the core flowpath 950 via vanes 860A, 860B to the adjacent turbine blade stages 862A, 862B.

Figure 4:
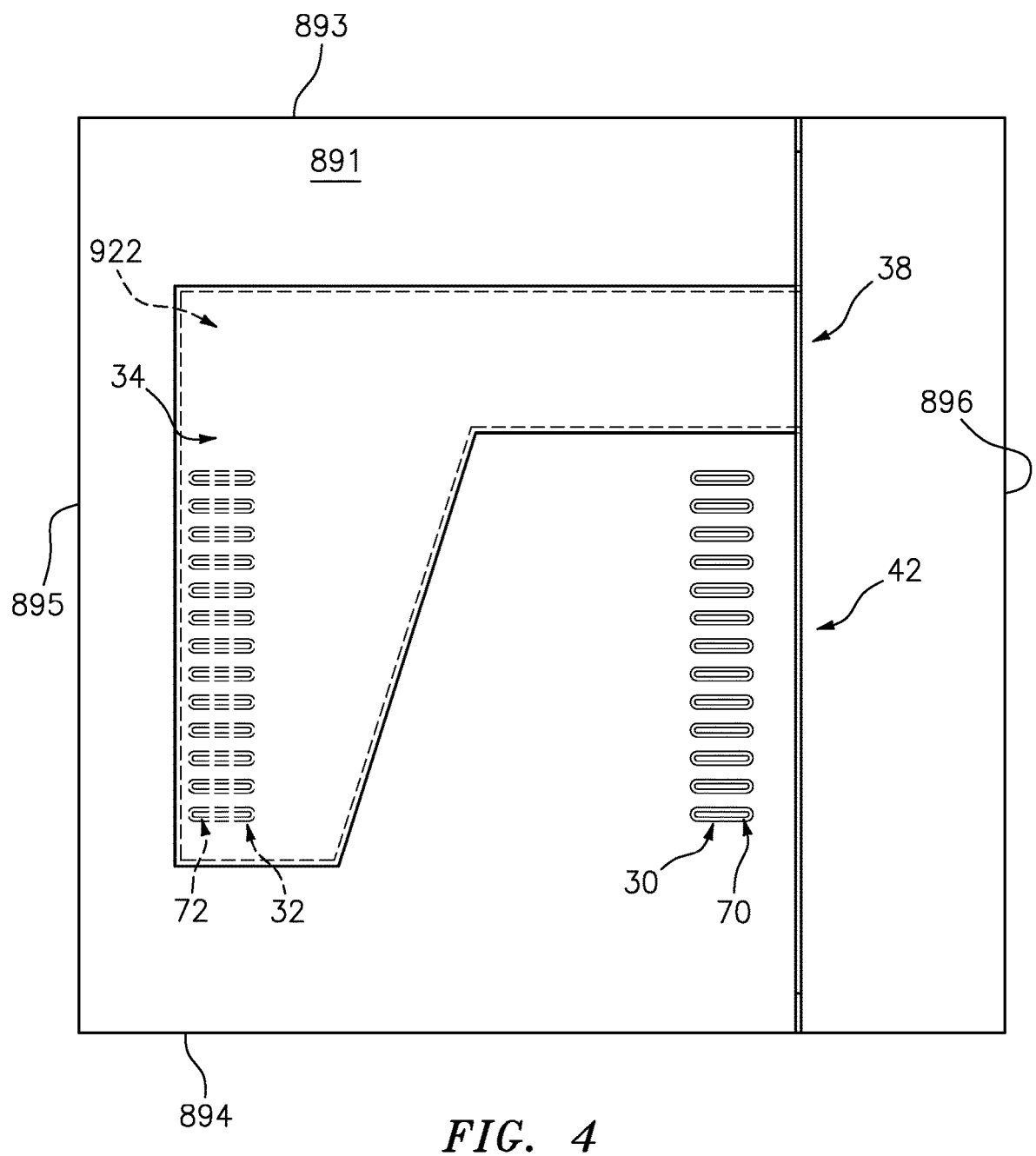
FIG. 4 is an inner diameter (ID) view of the manifold

FIG. 2 shows the ID case 820 formed of a plurality of segments arrayed axially and circumferentially. One particular segment 890 is shown integrated with the heat exchanger 20. In the example, the segment 890 forms an outer diameter (OD) wall of a manifold unit. The exemplary segment 890 is shown as a cylindrical or frustoconical segment and may be secured to adjacent segments such as by welding or by bolting. The segment 890 has an inner diameter (ID) surface 891, an outer diameter (OD) surface 892, a first circumferential end 893, a second circumferential end 894, a forward/upstream end 895 (ID view of FIG. 4), and an aft or downstream end 896. The exemplary plates 24 are mounted to the OD surface 892 (e.g., via welding, brazing, fasteners, and the like).

Figure 3:
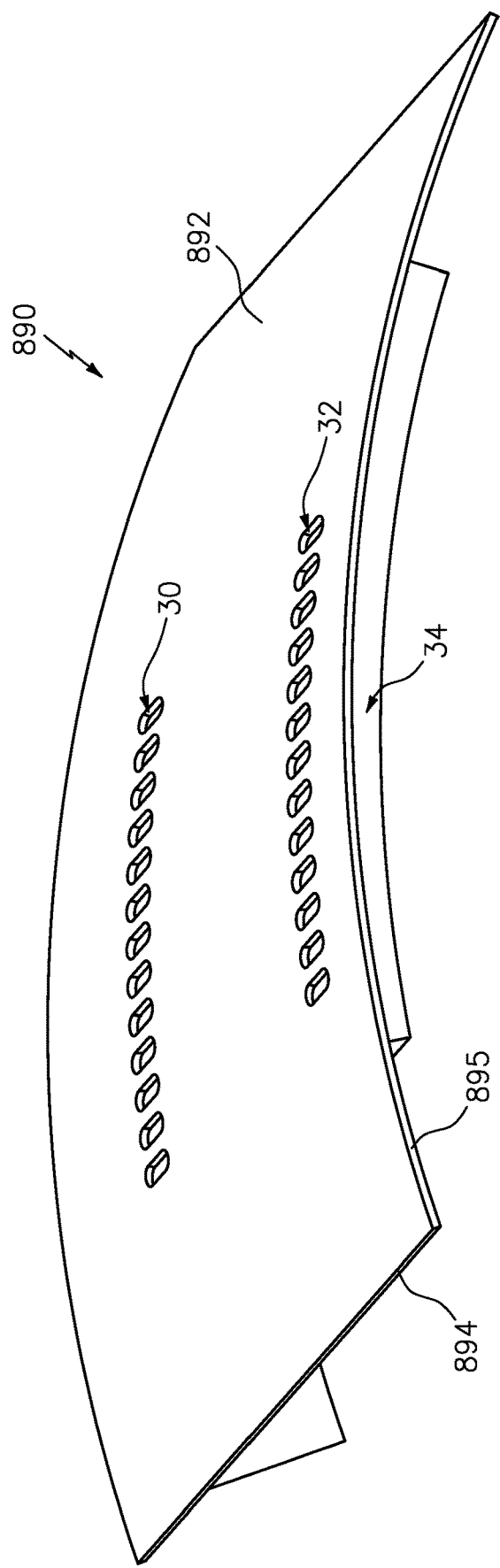
FIG. 3 is a view of a manifold of the heat exchanger including an inner diameter (ID) case segment.
Figure 5:
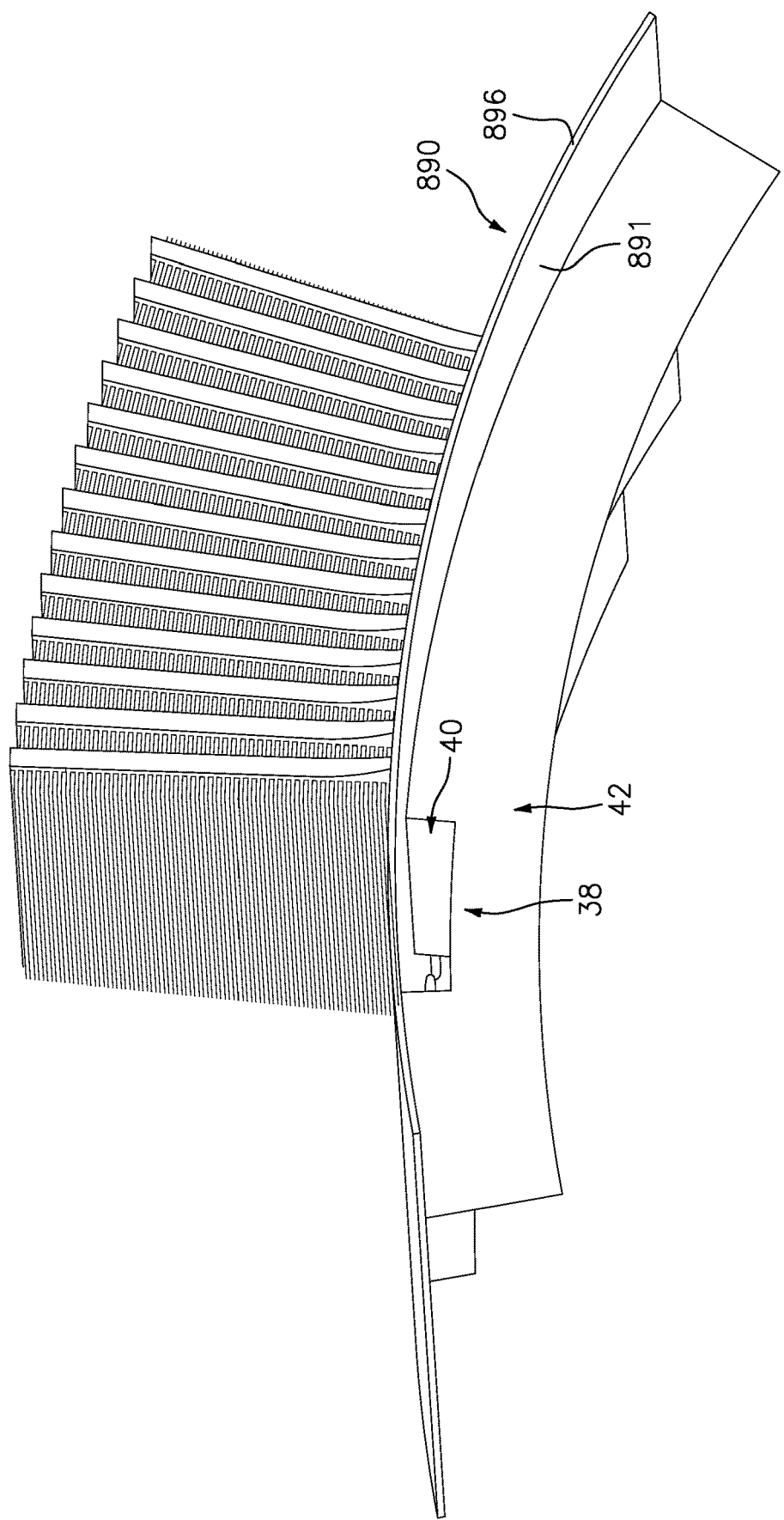
FIG. 5 is an aft oblique view of the heat exchanger.

In the exemplary embodiment, the segment 890 has a circumferential array of ports for mating with associated ports on the plates. In the exemplary embodiment, for each plate, the segment 890 (FIG. 3) includes a first port 30 and a second port 32. As is discussed further below, the first port 30 passes an inlet flow to the associated plate and the second port 32 receives an outlet flow from the plate. As is discussed further, the ports may be sockets that receive associated plugs of the associated plates. To collect the outlet flows and isolate them from the inlet flows, a manifold shroud 34 (FIG. 4) is mounted to the segment ID surface 891 to combine with the enclosed portion of the ID surface 891 to define an outlet manifold bounding an outlet plenum 922. The ports 32 thus form inlets to the outlet plenum 922 and, in this example, the manifold and plenum 922 have an exemplary single outlet 38 (FIG. 5—e.g., optionally at a fitting—not shown). There may be multiple outlets such as to a distribution plenum for distributing air circumferentially.

The exemplary outlet 38 falls along an aperture 40 (FIG. 5) in a seal flange 42 that separates the combustor diffuser 852 from a space aft thereof. The exemplary seal flange 42 extends radially inward from an outer diameter (OD) edge at the ID surface of the segment 890 (e.g., welded or brazed thereto) to an inner diameter (ID) edge and circumferentially between two lateral/circumferential ends. This seal flange 42 helps create a pressure difference and guide the entering first flow 910 to the ports 30 and associated plate inlets. The seal flange 42 also isolates/separates the downstream segment/leg of the first flowpath 900 exiting the heat exchanger from the upstream segment/leg of the first flowpath 900 entering the heat exchanger. Just as the segment 890 may abut other segments (whether manifold or plain), the flange 42 may abut flanges of other segments at the lateral ends.

Alternatively, the outlet 38 may be along a conduit passing through the seal flange 42 (e.g., through the aperture 40). Any number of sealing mechanisms (not shown) may be used to mate the conduit with the seal flange 42, including W-seals, piston seals, dogbone seals, snap fits, and the like. Such one or more conduits may feed individual locations or a shared cooled air plenum that, in turn, feeds multiple locations.

Each plate 24 comprises a body or substrate 52 (FIG. 2—e.g., cast or additively manufactured alloy such as nickel-based superalloy) having a leading edge 54 (FIG. 1A), a trailing edge 56, a proximal edge (inboard or inner diameter (ID) edge in the example) 58, a distal edge (outboard or outer diameter (OD) edge in the example) 60, a first circumferential (generally circumferentially facing) face 62 (FIG. 2) along a first side of the plate and a second circumferential face 64 along an opposite second side. In general, the term "plate" or "panel" may be applied at any of several levels of detail. It may identify a body or substrate of an assembly or the greater assembly or subassembly (e.g., a cast substrate plus one or more separately-attached fin arrays).

The exemplary plate inlets 70 and outlets 72 (FIG. 4) are along the proximal edge 58 (e.g., on plugs protruding from a flat main portion of the proximal edge 58 and received in the sockets forming the respective ports 30 and 32). Examples of plate interior configuration are found in International Patent Application No. PCT/US2020/067289 (the '289 application), filed Dec. 29, 2020, and entitled "Aircraft Heat Exchanger Assembly", the disclosure of which is incorporated by reference herein in its entirety as if set forth at length. Alternative plate configurations are shown in copending U.S. patent application Ser. No. 17/124,790 (the '790 application), filed Dec. 17, 2020, and entitled "Aircraft Heat Exchangers and Plates", the disclosure of which is incorporated by reference herein in its entirety as if set forth at length. The '790 application also discussed resonance behavior benefits of the face convergence.

In various implementations, the integration of the heat exchanger manifold with the case and/or the open inlet from the diffuser (rather than a piped inlet to an inlet manifold) may allow for radial compactness and maximization of heat exchange for a given radial span of the bypass duct.

As is discussed below, one or both faces 62, 64 may bear fin arrays 80 (FIG. 2). Although fin arrays formed unitarily with the body or substrate are possible, the exemplary fins are separately formed (e.g., of folded sheetmetal—e.g., nickel-based superalloy) and secured to adjacent substrate(s) (generally see the '740 patent; also see copending U.S. patent application Ser. No. 17/137,946 (the '946 application), filed Dec. 30, 2020, and entitled "Aircraft Heat Exchanger Finned Plate Manufacture", the disclosure of which is incorporated by reference herein in its entirety as if set forth at length). The '946 application discloses adjacent faces of adjacent plates having separate fin arrays. These may be cut from a wave such as via electrodischarge machining (EDM (e.g., wire EDM). In particular this facilitates plate arrays where adjacent faces are not parallel (e.g., when mounted radially to the convex OD surface of a manifold).

In embodiments where adjacent plate faces are parallel, exemplary fins are square wave corrugations of even height/amplitude so that each inter-plate gap in each plate bank is spanned by a respective one fin array whose peaks are secured to one adjacent substrate and troughs to the other.

Although the exemplary embodiment shows plates 24 (FIG. 2) extending radially and thus diverging from each other, alternative embodiments may include the plates being parallel or in parallel groups with the groups diverging from each other. Parallelism may allow ease of assembly and modularity.

Figure 6:
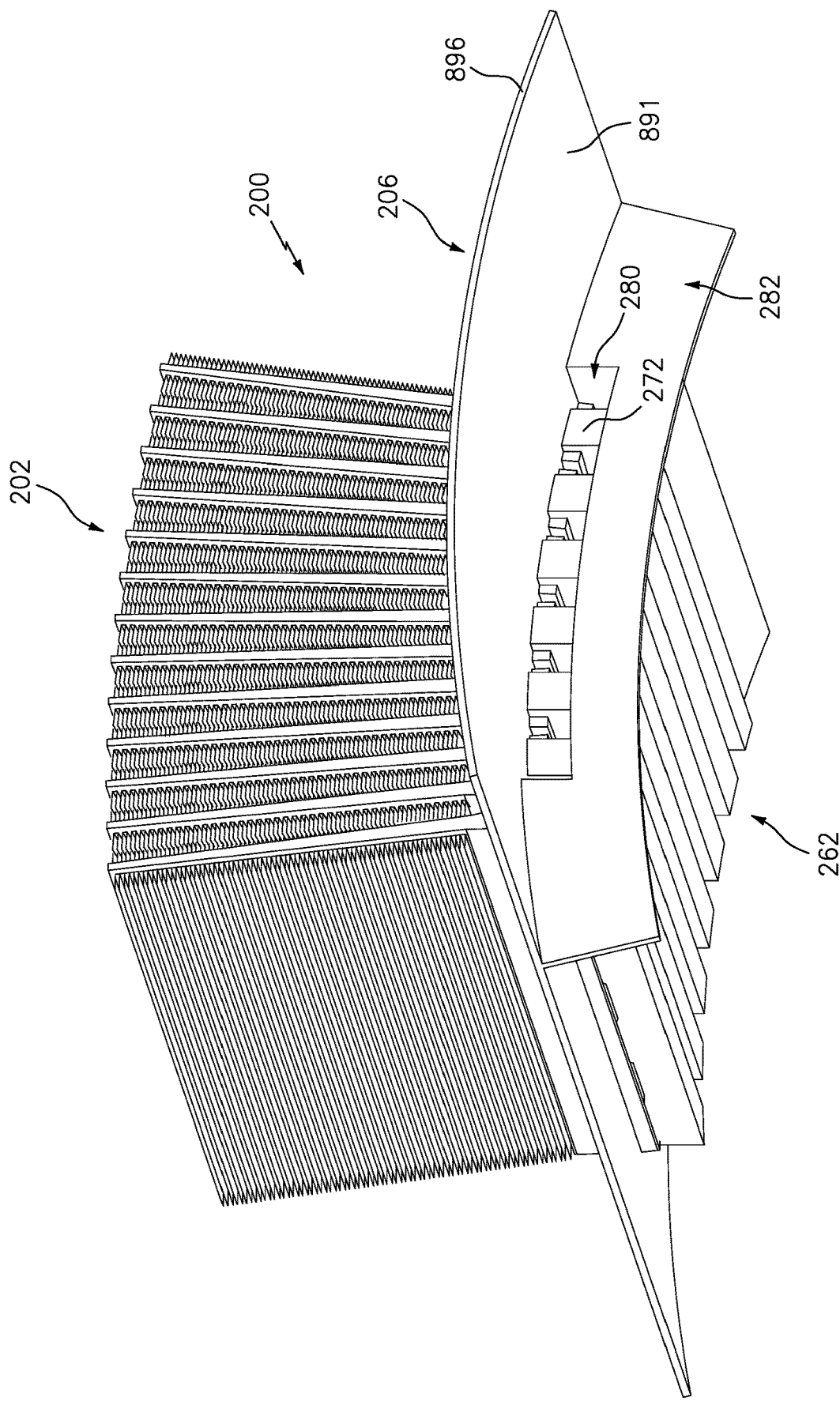
FIG. 6 is an aft oblique view of a second heat exchanger.
Figure 7:
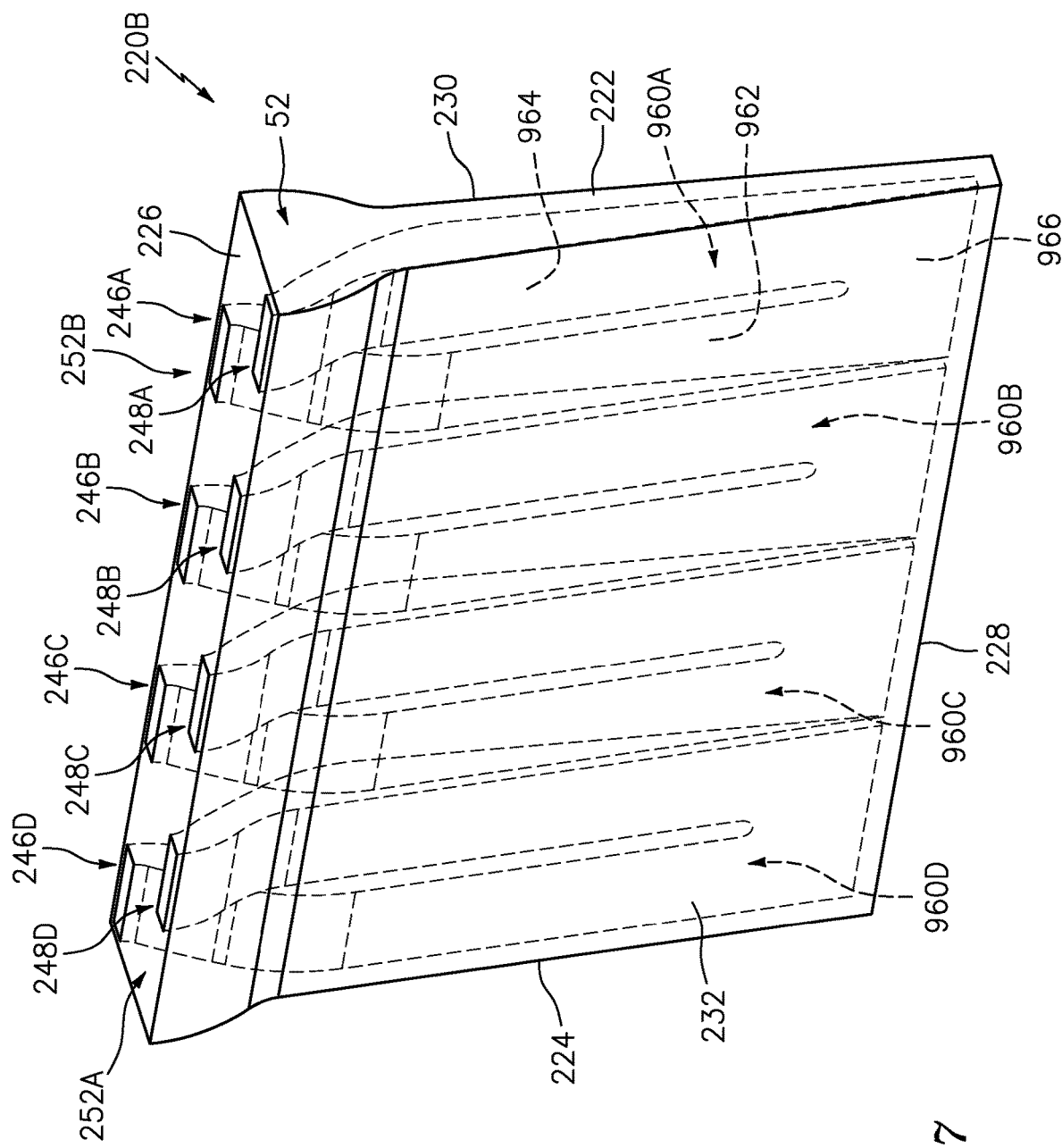
FIG. 7 is a view of a plate substrate of the second heat exchanger

Additionally, other variations on plate feed may be provided. For example, U.S. Patent Application No. 62/963,072 (the '072 application), filed Jan. 19, 2020, and entitled "Aircraft Heat Exchanger", the disclosure of which is incorporated by reference herein in its entirety as if set forth at length, discloses plates having multiple inlets and outlets. In that application, inlet and outlet plenums have interdigitated legs allowing each leg to service the various inlet ports or outlet ports of one or two plenums. A similar plenum structure could be used in the present case-integrated heat exchanger with only the outlet plenum having an inner diameter wall. FIG. 6 shows such a heat exchanger 200 whose plates and manifold structure are configured to provide a greater cross-flow effect. FIG. 7 shows a substrate of one of the plates with passageways in broken lines.

Figure 10:
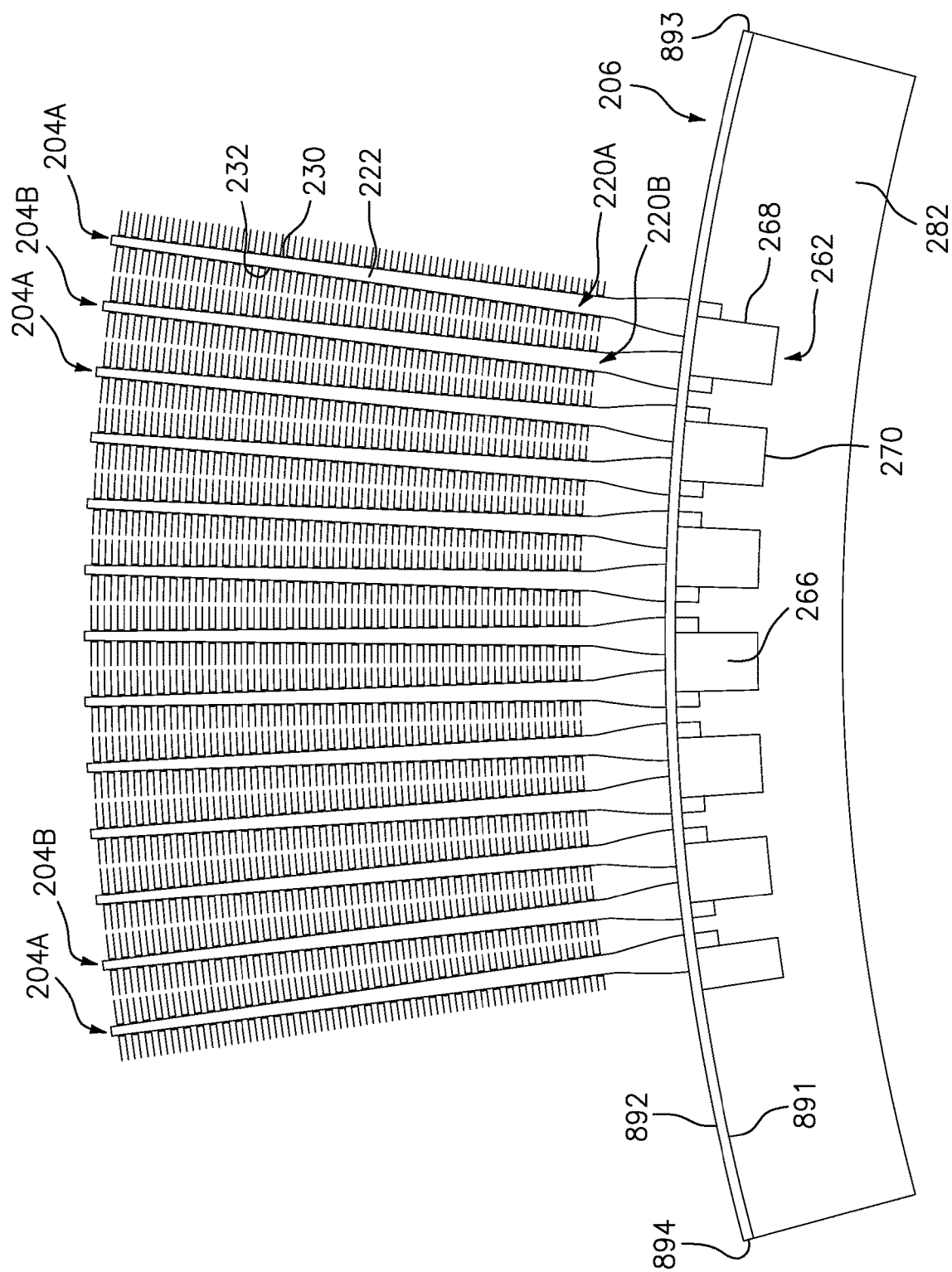
FIG. 10 is a front view of the second heat exchanger.

The heat exchanger 200 has a bank 202 of plates 204A, 204B (FIG. 10) in an array, a manifold/case segment 206 in place of the segment 890, and flange 282 in place of the flange 42. Except for ports, the segment 206 may be similar to the segment 890 and its features similarly numbered. As is discussed further below, the exemplary plates 204A are of opposite sense to the plates 204B (e.g., mirror images) and alternate therewith in the bank 202. In the exemplary bank 202, the plates extend axially and radially relative to the axis 10.

Each plate 204A, 204B comprises a body or substrate 220A, 220B (FIG. 7) (e.g., cast or additively manufactured alloy such as nickel-based superalloy) having a leading edge 222, a trailing edge 224, a proximal edge 226 (an inboard or inner diameter (ID) edge in the illustrated example), a distal edge 228 (an outboard or outer diameter (OD) edge in the example), a first lateral face 230 (circumferential (generally circumferentially facing) face) at one side, and a second lateral face 232 (circumferential face in the example at the opposite side).

Each plate 204A, 204B (FIG. 7) has a plurality of inlet ports (inlets) 246A, 246B, 246C, 246D and a respective plurality of outlet ports (outlets) 248A, 248B, 248C, 248D. Between each inlet port and its respective associated outlet port, a respective passageway 960A, 960B, 960C, 960D extends.

Each passageway 960A, 960B, 960C, 960D has an upstream leg 962 (upstream along the associated leg/branch of the first flowpath 900—but, in the example, downstream along the second flowpath 902 to provide a partial counter-flow effect), a downstream leg 964, and a turn 966 near the distal edge 228. Thus, in each plate passageway 960, an associated portion of the first flow 910 passes generally from downstream along the second flowpath (near the trailing edge 224) to upstream (nearer the leading edge 222). Thus, there is a bit of a counter-flow heat exchange effect. In the exemplary embodiment, each of the passageways 960A-960D of a given first plate 204A is identical to each other. Similarly, each passageway 960A-960D of a given second plate 204B is identical to each other and a mirror to those of the first plate.

In the exemplary mating configuration between segment 206 and plates 204A, 204B, the proximal edge 226 is flat with the ports 246A-246D to one side and the ports 248A-248D to the other. The proximal portion of the plate is received in a respective slot 260 (FIG. 8) in the segment 206 and secured such as by welding, brazing, or diffusion bonding. In an alternative mating configuration (not shown) between segment and plates, the plate proximal edge has a central recess dividing the proximal edge of the plate into a respective first boss bearing the ports 246A-246D and a respective second boss bearing the ports 248A-248D. Both such bosses protrude radially inward from a central base portion of the channel in the proximal edge. The bosses are received in respective slots in the segment and secured such as by welding, brazing, or diffusion bonding.

Figure 8:
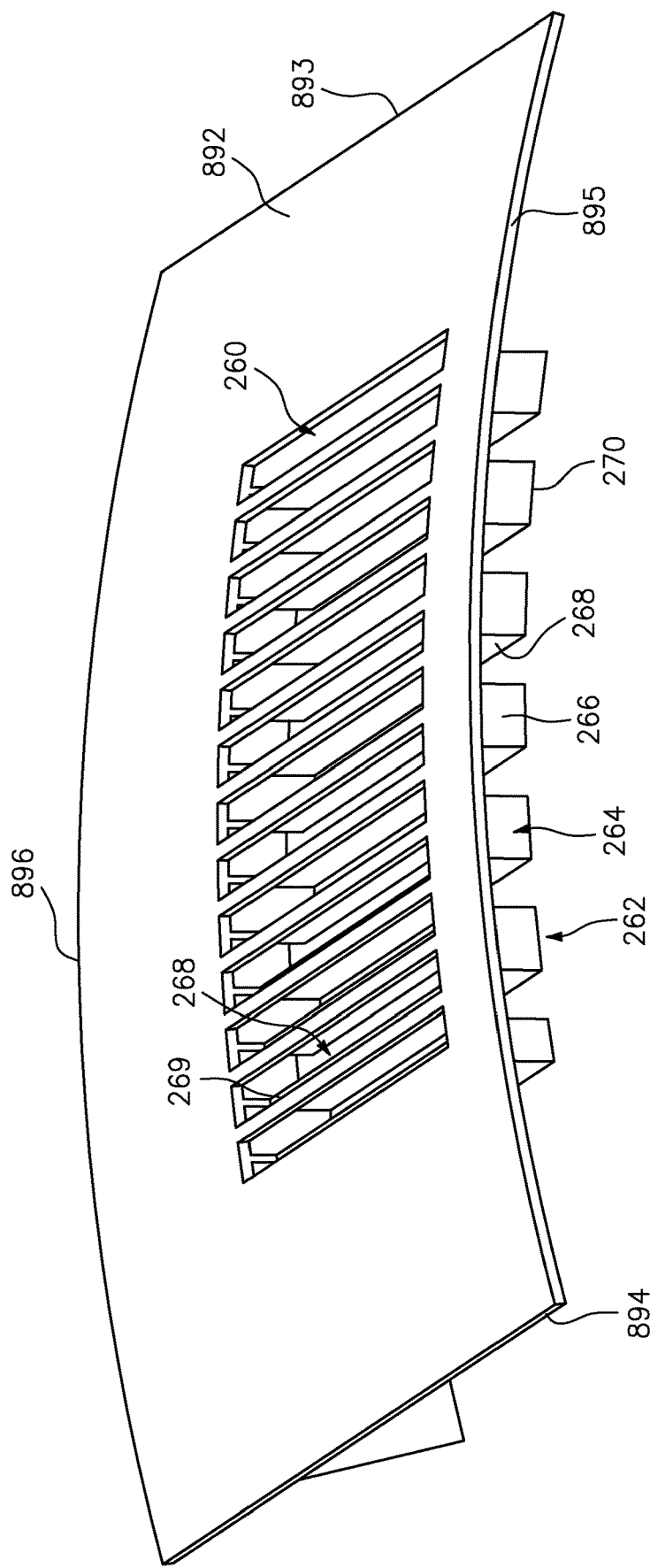
FIG. 8 is a front oblique view of a manifold of the second heat exchanger.
Figure 9:
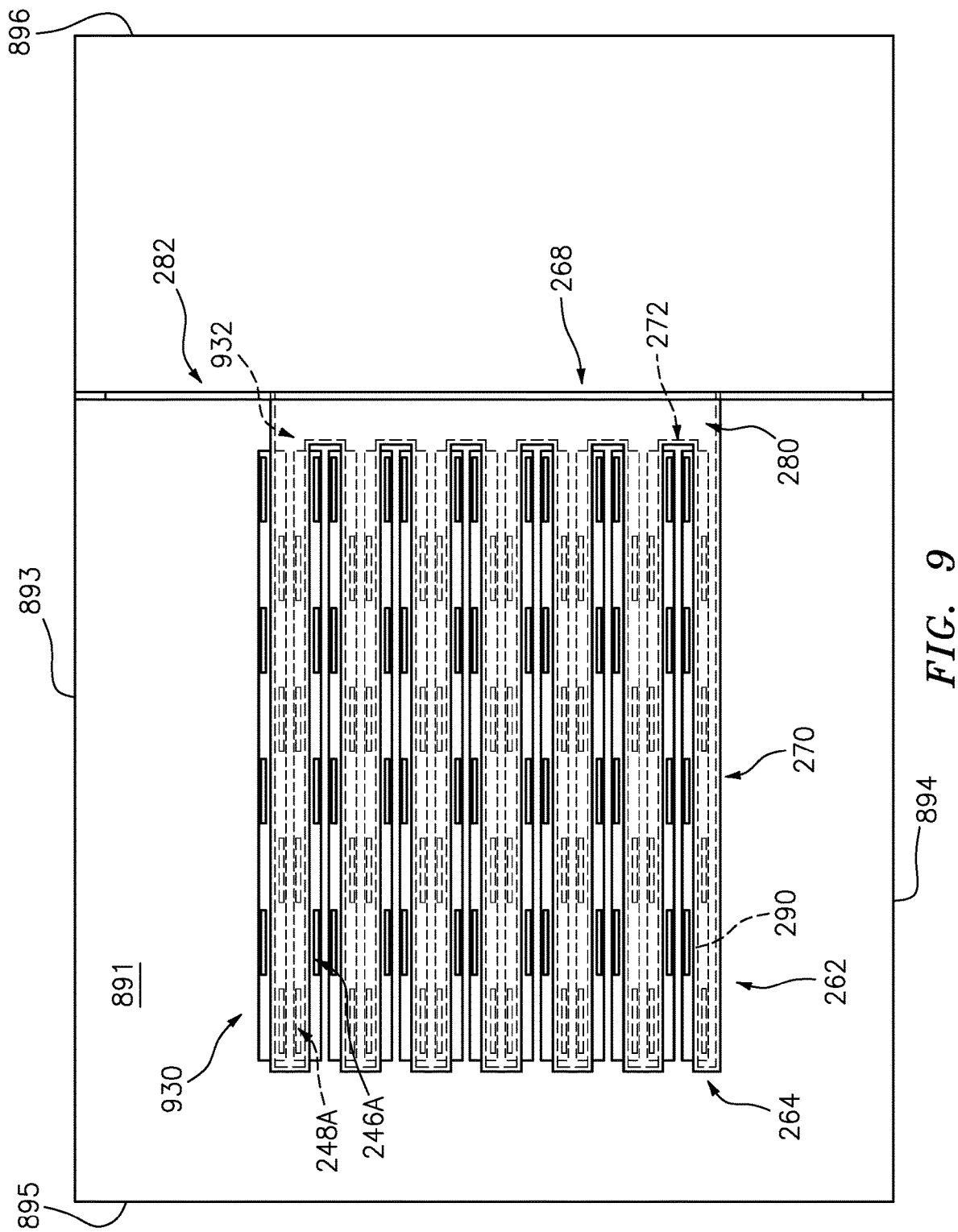
FIG. 9 is an inner diameter view of the second heat exchanger.

FIG. 8 also shows a shroud 262 secured to the underside 891. The shroud has a series of fingers 264 dividing an inlet plenum 930 from an outlet plenum 932 (FIG. 9). The fingers have closed forward ends at walls 266 (FIG. 8), sidewalls, 268, and base wall 270 forming a channel structure along the shroud ID surface. The fingers have open aft ends, with walls 272 (FIG. 6) adjoining adjacent fingers. An aft portion of the shroud 262 forms an outlet along an aperture 280 in the flange 282 (similar to the flange 42).

The exemplary inlet plenum and exemplary outlet plenum have interdigitated terminal legs extending axially. In the illustrated embodiment, except at terminal port banks/bosses (at the two ends of the plate array), each plenum leg communicates with the ports of two adjacent port banks of two adjacent plates. Thus, in this example with mirror image plates, the flow within each plate is parallel the flow in the adjacent plate. To divide the two plenums 930, 932 from each other, the shroud includes a wave-like wall structure 290 (FIG. 9) formed by the walls 266, 268, and 272 shared by and separating the inlet and outlet manifold and dividing their plenums' respective fingers/legs from each other.

FIG. 9 shows the wall structure 290 as including a plurality of axially-extending walls 268 separating adjacent plenum fingers/legs from each other. With the illustrated unbossed plates, the outer diameter (OD) of the walls 268 centrally span associated apertures 260 with edges 269 (FIG. 8) of the walls 268 are recessed below the ID surface 891 to abut the associated plate proximal edge and separate the inlet ports of that plate from the outlet ports. With the alternative bossed plates, the two bosses may be received in or otherwise mate with two distinct apertures in the segment on the respective sides of the wall 268 which may lack a recessing of its OD edge (e.g., the OD edge may be secured/sealed to an intact web of the segment between the two apertures).

Exemplary manufacture techniques may be conventional for case segments. This may involve machining or casting of nickel-based superalloy. Similarly, the individual plates may be cast and subject to finish machining along with attachment, if any, of fins. The wall 34 may similarly be machined or, requiring a less robust structure, may be stamped and secured to the inner diameter surface 891 such as via welding, brazing, diffusion bonding, or bolting or screwing. Other manifold and plate configurations are possible.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A turbine engine comprising:
   one or more fan sections;
   one or more compressor sections aft and downstream of the one or more fan sections along a core flowpath;
   a combustor section downstream of the one or more compressor sections along the core flowpath;
   one or more turbine sections downstream of the combustor section along the core flowpath;
   a bypass flowpath;
   an inner case wall along the bypass flowpath;
   an array of heat exchanger plates mounted to the inner case wall for providing heat transfer from a first flowpath to the bypass flowpath, wherein each plate has:
   first and second faces along the bypass flowpath;
   a proximal edge mounted to the inner case wall;
   an inlet along the proximal edge;
   an outlet along the proximal edge; and
   a branch segment of the first flowpath passing from the inlet to the outlet; and
   a flange extending radially inward from an inner diameter surface of the inner case wall to separate a downstream segment of the first flowpath exiting the heat exchanger from an upstream segment of the first flowpath entering the heat exchanger, said downstream segment being downstream of said upstream segment with respect to the first flowpath.

2. The turbine engine of claim 1 wherein:
   the array of heat exchanger plates is mounted to a segment of the inner case wall.

3. The turbine engine of claim 1 wherein:
   the segment of the inner case wall is a single metallic plate.

4. The turbine engine of claim 1 wherein:
   the inner case wall has a plurality of first ports and a plurality of second ports;
   the first ports are mated to the plate inlets; and
   the second ports are mated to the plate outlets.

5. The turbine engine of claim 4 wherein:
   the inner case wall first ports are aft of the second ports.

6. The turbine engine of claim 4 wherein:
the inner case wall first ports are open to a diffuser outboard of the combustor; and
the inner case wall second ports are open to an outlet plenum.

7. The turbine engine of claim 6 wherein:
a manifold shroud is mounted to an inner diameter surface of the inner case wall to bound the outlet plenum.

8. The turbine engine of claim 6 wherein:
the outlet plenum has a plurality of legs.

9. The turbine engine of claim 6 wherein each plate has:
multiple said inlets along the proximal edge;
multiple said outlets along the proximal edge; and
respective said branch segments from each said inlet to an associated said outlet.

10. The turbine engine of claim 1 wherein:
the first flowpath is a compressor bleed flowpath.

11. The turbine engine of claim 1 wherein:
the first flowpath provides turbine cooling.

12. The turbine engine of claim 1 wherein:
the bypass flowpath extends from a stage of the one or more fan sections.

13. The turbine engine of claim 12 wherein:
the first flowpath extends from within or downstream of the one or more compressor sections.

14. A method for using the turbine engine of claim 1, the method comprising running the turbine engine to:
transfer thermal energy from a flow along the first flowpath to a bypass flow along the bypass flowpath.

15. The method of claim 14 wherein the running the turbine engine comprises:
passing the bypass flow to the heat exchanger at a first temperature and first pressure; and
passing the flow along the first flowpath to the heat exchanger at a second temperature and second pressure greater than the first temperature and first pressure, respectively.

16. The method of claim 14 wherein:
the flow is generally counter-flow to the bypass flow.

17. The method of claim 14 wherein:
the flow is generally cross-flow to the bypass flow.

18. A turbine engine comprising:
one or more fan sections;
one or more compressor sections aft and downstream of the one or more fan sections along a core flowpath;
a combustor section downstream of the one or more compressor sections along the core flowpath;
one or more turbine sections downstream of the combustor section along the core flowpath;
a bypass flowpath;
an inner case wall along the bypass flowpath;
an array of heat exchanger plates mounted to the inner case wall for providing heat transfer from a first flowpath to the bypass flowpath, wherein each plate has:
first and second faces along the bypass flowpath;
a proximal edge mounted to the inner case wall;
multiple inlets along the proximal edge;
multiple outlets along the proximal edge; and
respective branch segments of the first flowpath passing from each said inlet to an associated said outlet.

19. The turbine engine of claim 18 wherein:
a proximal portion of each said plate is received in a respective slot in the inner case wall.

20. The turbine engine of claim 18 wherein for each plate:
the first face and second face are at respective sides of the plate; and
the multiple said inlets are offset to one said side of the plate and the multiple said outlets are offset to the other said side of the plate.

21. The turbine engine of claim 18 further comprising:
means for separating a downstream segment of the first flowpath exiting the heat exchanger from an upstream segment of the first flowpath entering the heat exchanger, said downstream segment being downstream of said upstream segment with respect to the first flowpath.

* * * * *